July 8, 1952 — C. E. KOONTZ ET AL — 2,602,883
EARLY WARNING DETECTOR
Filed Nov. 17, 1942 — 2 SHEETS—SHEET 1

Inventors
CLARENCE E. KOONTZ
IRVING H. PAGE

Inventors
CLARENCE E. KOONTZ
IRVING H. PAGE

Patented July 8, 1952

2,602,883

UNITED STATES PATENT OFFICE 2,602,883

EARLY WARNING DETECTOR

Clarence Edgar Koontz, Washington, D. C., and Irving H. Page, Silver Spring, Md.

Application November 17, 1942, Serial No. 465,918

9 Claims. (Cl. 250—1)

(Granted under the act of March 3, 1883, as amended April 30, 1928; 370 O. G. 757)

This invention relates broadly to a means for detecting the presence of enemy radio range finding apparatus and simultaneously ascertaining certain vital characteristics thereof. These characteristics include such items as frequency, pulse recurrence rate, and the general type of equipment employed thereby.

The basic principle of range finding whether by means of radio waves or sound waves is very much the same, since the velocity of both waves are known or readily calculable. In either case the general procedure followed is first to send out an energy pulse, usually in a uni-directional path. This pulse continues out in its chosen path until it strikes an obstacle whereby some of its energy is reflected back to the point of transmission. By measuring the time interval elapsed between the transmission of the pulse and the reception of its echo a measurement of the total distance covered by the pulse may be obtained. The range of the obstacle from the point of transmission is, however, one-half this distance since the measured time interval includes the time required for the pulse to travel out to the obstacle and back again. The discrepancy in the two systems of range finding resides, however, in the fact that sound waves are auricular and provide a means open to the party being ranged upon for determining the presence of the ranging party while radio waves offer no such expedient means of detection. It is therefore an object of this invention to provide a means for detecting the presence of remote radio ranging equipment.

It is another object of this invention to provide a means of ascertaining the rate of pulse recurrence employed by the remote ranging apparatus.

It is another object of this invention to provide a means of measuring the carrier frequency at which remote ranging apparatus is operating.

Other objects of the present invention will become apparent upon a careful consideration of the following description when taken together with the accompanying drawings, in which.

Figure 1:
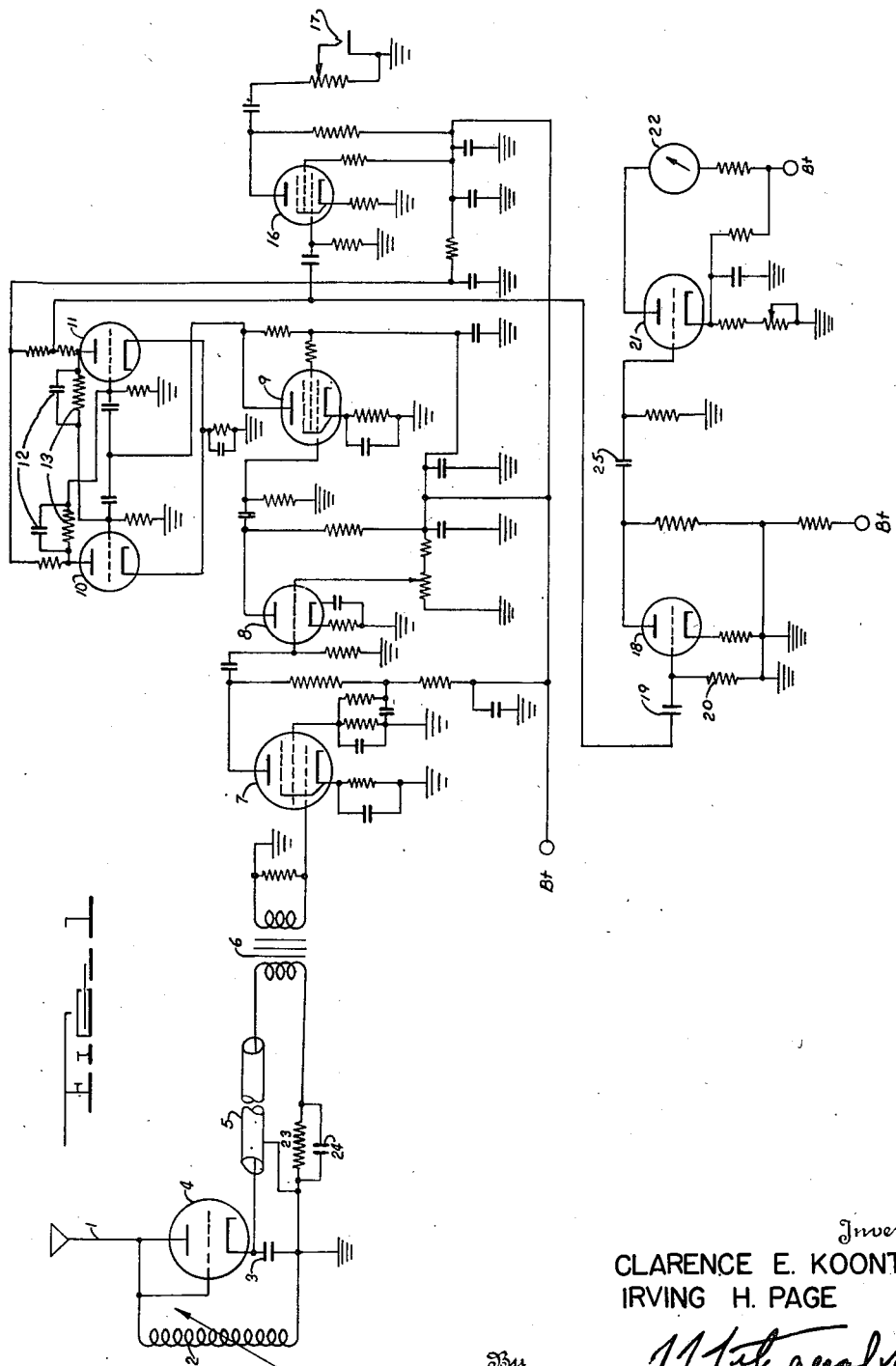
Fig. 1 is a schematic circuit diagram of a pulse receiver including a preferred embodiment of the present invention.

Referring now to the schematic circuit diagram, reference character 1 pertains to an antenna, the output of which is connected directly to the anode of a diode 4. The variable inductance 2 is connected in shunt with the diode 4 and is capable of tuning the antenna reactance and diode stray capacitance 3 to anti-resonance over a frequency range, for instance, of 70 to 700 megacycles. Parallel resistance 23 and capacitance 24 inserted in the cathode circuit of diode 4 increases considerably the sensitivity of the tube. The rectified positive output of diode 4 is fed through coaxial transmission line 5 to the input of pulse transformer 6. The output of the transformer 6 is fed into a pair of cascaded class "A" amplifiers 7 and 8, the output of which is connected to a class "B" amplifier or limiter amplifier 9 which produces a sharp negative pulse. The output of amplifier 9 is used to trigger a pulse expander circuit comprising triodes 10 and 11 which produces a substantially square wave voltage. A portion of the square wave energy is fed into an audio amplifier 16 which is used to drive a pair of earphones or loud speaker and thereby produce an audio signal indicative of the fact that the gear is in the field of a pulse transmitter. The remaining energy portion of the square wave which is but a small portion of the total square wave energy is fed into amplifier 18 through a differentiating coupling circuit comprising capacitance 19 and resistance 20. The output of this amplifier is a positive pulse having a fixed amplitude and time duration and is fed into another amplifier 21 which is normally biased to cut-off. Each time a positive pulse is fed into the amplifier 21 a plate current will flow, the average value of which is proportional to the pulse time length, amplitude and rate of recurrence which is measured by meter 22. Since the pulse time length and amplitude are fixed, the sole governing factor of plate current will be the rate of recurrence which is, of course, a function of the rate of recurrence of the incoming pulses. Consequently by calibrating meter 22 in either pulses or cycles per second a direct measurement of the pulse repetition rate of the pulse transmitter may be obtained. As yet there is no expedient means of ascertaining what degree of polarization is employed by the remote transmitter, but by positioning the antenna on a 45° angle with the horizontal, either vertical or horizontal waves may be received. Provisions can be made, however, to rotate the antenna to either a vertical or horizontal position after a signal has been received with the antenna in an inclined position.

Figure 2:
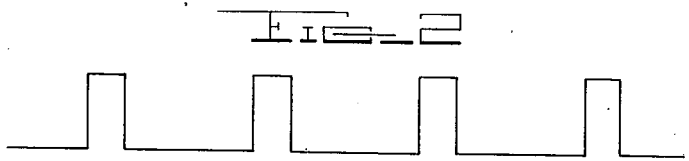
Fig. 2 is a graphical representation of a typical series of rectified rectangular voltage pulses that are ordinarily fed into the first stage of amplification in this novel receiver.

A more detailed description of this invention may be obtained by assuming that the present apparatus is installed on board an airplane which is engaged in patrolling large expanses of water and coast line. The operator of the present apparatus will continually adjust inductance 2 until an audio signal is observed in the earphones or loud speaker which indicates that the airplane is in the field of a pulse transmitter. At this point the operator will set inductance 2 to a position where maximum signal is obtained which will occur when inductance 2 tunes to anti-resonance, the antenna reactance and stray capacities 3 of diode 4 and consequently produces maximum signal voltage across diode 4. By calibrating variable inductance 2 in either frequency or centimeters or both a direct measurement of the pulse transmitter frequency is obtained. The rectified pulse output of diode 4 is fed into the input of pulse transformer 6 which has its secondary winding so connected that a positive pulse as shown in Fig. 2 which is usually a square-topped rectangular pulse is fed into amplifier 7. This class "A" amplifier 7 has its plate and cathode circuit values so chosen that it produces a sharp negative voltage pulse having a small positive over-swing on its trailing edge which is fed into class "A" amplifier 8. This amplifier also has its plate and cathode circuit values so chosen that it produces a sharp, equal-swing positive-negative voltage which is fed into the limiter amplifier or class "B" amplifier 9. This amplifier contains a high cathode bias with low plate and screen voltages which will essentially eliminate all negative grid swings. The output of this amplifier is a sharp high negative voltage pulse having a very small positive over-swing on the trailing edge which is fed into the pulse expander circuit comprising triodes 10 and 11. This circuit is well known to the art and is often referred to as a "Counter" and operates briefly as follows:

Let it be assumed that triode 11 heats up first and starts to conduct; thus, its anode voltage will be down because of the IR drop in its plate circuit while the anode voltage of triode 10 will be almost up to "B." Upon the application of the sharp negative voltage from tube 9 the grid of 11 is kicked sharply negative thereby stopping the plate current drain of triode 11 which consequently causes its anode voltage to rise immediately to almost "B+." This sharp rise of anode voltage of triode 11 is impressed upon the grid of 10 which consequently starts tube 10 to conduct thereby dropping its anode voltage which is impressed upon the grid of 11 to hold it non-conducting until another sharp negative voltage pulse from 9 is applied to the grids of 10 and 11.

It is obvious that the negative voltage pulses derived from amplifier 9 will cause first one triode of the pulse expander circuit to conduct and then the other and consequently cause a substantially square wave voltage output having a repetition rate equal to one-half the repetition rate of the incoming pulses, since it requires two incoming pulses to cause one triode to complete a cycle from a conducting state to a non-conducting state and back again. The comparison of the two repetition rates is shown more clearly in Figs. 2 and 3.

Figure 3:
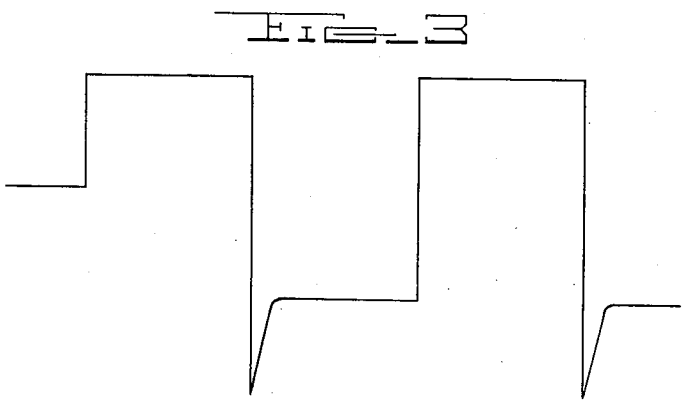
Fig. 3 is a graphical representation of a square wave voltage which is generated by a select stage of this receiver and having a frequency which is proportional to the frequency of the voltage pulses shown in Fig. 2.

The comparatively large over-swing of the sharp negative voltage in the square wave shown in Fig. 3 is mainly due to the fact that upon the application of the sharp negative voltage "pip" from amplifier 9 one of the triodes 10 or 11 undergoes a large instantaneous rise in anode voltage. This large rise in voltage is applied to the grid of the other triode which consequently drives this tube far into the conducting region and therefore causes said tube to drive an excessive plate current thereby dropping its anode voltage far below normal which is later modified to some predetermined value subsequent to the termination of the negative voltage "pip" from amplifier 9.

Figure 4:
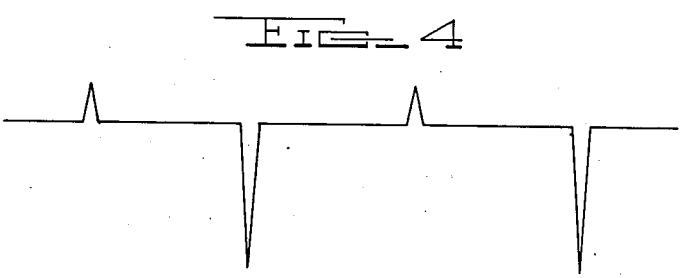
Fig. 4 is a differentiated wave form of the square wave voltage shown in Fig. 3 and having a recurrence rate equal to the recurrence rate of the voltage shown in Fig. 2 and also a preselected amplitude.
Figure 5:
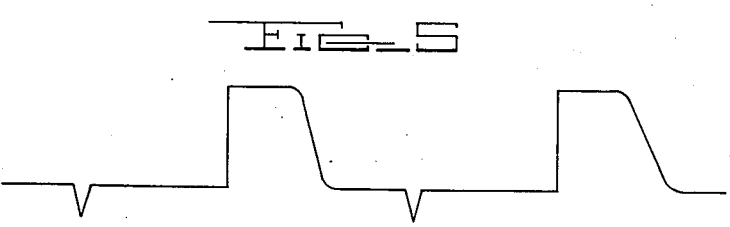
Fig. 5 is a graphical representation of the type wave form used in measuring the pulse recurrence rate of the incoming pulses.

The main portion of the square wave energy from the counter circuit is fed into amplifier 16 which drives a pair of earphones or speaker taken from the jack 17. The pitch of the audionote reproduced in the loud speaker or earphones will of course be a function of the recurrence rate of the incoming pulses. The remaining energy portion of the square wave output of the pulse expander circuit is fed into the amplifier 18 through a differentiating circuit comprising capacitance 19 and resistance 20. The function of this differentiation circuit or short time constant circuit is to sharpen up the square wave voltage and to alter its wave form according to that shown in Fig. 4. By correlating Figs. 3 and 4 a better understanding of this action may be obtained. The small positive voltage "pip" in Fig. 4 occurs simultaneously with the abrupt rise in voltage of Fig. 3; the reason for this is because condenser 19 is very small and therefore will charge only when there is a change in voltage, while a comparatively large negative "pip" will occur simultaneously with the abrupt drop in square wave voltage. The unequal amplitudes of the positive and negative "pips" of Fig. 4 is due to the large negative over-swing of the square wave voltage, which is further due to the kick-over action of the pulse expander circuit itself. The voltage output of 18 charges a large condenser 25 which produces a broad positive pulse followed by a sharp negative "pip" as shown in Fig. 5. These pulses are fed into an amplifier 21 which is normally biased to cut-off so the negative grid swings do not affect the drawing of plate current while the positive grid swings cause tube 21 to draw a plate current, the average value of which is a function of the time length and rate of recurrence of the positive pulses shown in Fig. 5 and later shown to be directly proportional to the rate of recurrence alone since the pulse time length and amplitude has been preselected, thus allowing meter 22 to read directly the rate of pulse recurrence. The time length and amplitude of the positive pulses of Fig. 5 are held constant since they are proportional to the amplitude of the negative "pip" voltage of Fig. 4 which is proportional to amplitude of the abrupt decrease in voltage of Fig. 3 and which is held constant by the rated current flow of the triodes 10 and 11 of the pulse expander circuit.

The maximum rate of pulse recurrence measurable by meter 22 is reached when amplifier 21 is drawing rated plate current which occurs at the point where the pulse recurrence rate of Fig.

2 is such that the negative "pips" of Fig. 5 reaches the edge of the positive pulse.

Inasmuch as the sensitivity of the present apparatus depends solely upon the reception of a pulse transmitted directly from the remote ranging gear and not upon a reflection, there is no reflection loss involved which consequently allows the detection of the remote ranging gear many times prior to its detection of the craft or airplane with this apparatus installed thereon. The pulse recurrence rate as measured by meter 22 is usually a fair indication of the general type of equipment employed by the remote gear such as, fire control equipment, or ordinary searching equipment.

The calibrated inductance 2 provides a direct and sufficiently accurate frequency measurement which consequently supplies the operator with the information needed in order to key a transmitter on the craft which is set at the same frequency employed by the radio detector station thereby blocking or over-riding any echo which might come from the craft itself.

Although we have shown and described certain and specific embodiments of the present invention we are fully aware of the many modifications possible thereof. Therefore this invention is not to be restricted except insofar as is necessitated by the prior art and spirit of the appended claims.

The invention described herein may be manufactured and used by or for the Government of the United States of America for governmental purposes without the payment of any royalties thereon or therefor.

We claim:

1. In combination a means for detecting the presence of a remote pulse transmitter and measuring the frequency output thereof, and a means for measuring the pulse repetition rate of said pulse transmitter comprising, a means for receiving incoming pulse energy having any particular frequency within a definite frequency range, said receiving means being adjustable to any particular frequency within said frequency range, a means for indicating either in frequency or in wave length the particular setting of said receiving means, a means for converting said pulse energy into a series of square wave pulses having a fixed amplitude and a repetition rate functional of said incoming pulses, a means for converting a portion of the energy derived from said square wave energy into an audio energy wave, a means for listening to said audio wave, a means for converting the remaining portion of said square wave energy into a series of standard energy pulses having a fixed amplitude and time duration with a repetition rate functional of the repetition rate of the incoming pulses and a means for controlling the average current flow through a current responsive device with said standard energy pulses.

2. In combination a means for detecting the presence of a remote pulse transmitter and measuring the frequency output thereof, and a means for measuring the pulse repetition rate of said pulse transmitter comprising, a means for receiving incoming pulse energy having any particular frequency within a definite frequency range, said receiving means being adjustable to any particular frequency within said frequency range, a means for amplifying said particular frequency, a means for indicating either in frequency or in wave length the particular setting of said receiving means, a means for converting said pulse energy into a series of square wave pulses, having a fixed amplitude and a repetition rate functional of said incoming pulses, a means for converting a portion of the energy derived from said square wave energy into an audio energy wave, a means for listening to said audio wave, a means for converting the remaining portion of said square wave energy into a series of standard energy pulses having a fixed amplitude and time duration with a repetition rate functional of the repetition rate of the incoming pulses and a means for controlling the average current flow through a current responsive device with said standard energy pulses.

3. In combination a means for detecting the presence of a remote pulse transmitter and measuring the frequency output thereof, and a means for measuring the pulse repetition rate of said pulse transmitter comprising, a means for receiving incoming pulse energy having any particular frequency within a definite frequency range, said receiving means being adjustable to any particular frequency within said frequency range, a means for rectifying the output of said receiving means, a means for amplifying said rectified output, a means for indicating either in frequency or in wave length the particular setting of said receiving means, a means for converting said pulse energy into a series of square wave pulses having a fixed amplitude and a repetition rate functional of said incoming pulses, a means for converting a portion of the energy derived from said square wave energy into an audio energy wave, a means for listening to said audio wave, a means for converting the remaining portion of said square wave energy into a series of standard energy pulses having a fixed amplitude and time duration with a repetition rate functional of the repetition rate of the incoming pulses and a means for controlling the average current flow through a current responsive device with said standard energy pulses.

4. In combination a means for detecting the presence of a remote pulse transmitter and measuring the frequency output thereof, and a means for measuring the pulse repetition rate of said pulse transmitter comprising a means for receiving incoming pulse energy having any particular frequency within a definite frequency range, said receiving means being adjustable to any particular frequency within said frequency range, a means for indicating either in frequency or in wave length the particular setting of said receiving means, a means for converting said pulse energy into a series of square wave pulses having a fixed amplitude and a repetition rate functional of said incoming pulses, a means for converting a portion of the energy derived from said square wave into an audio energy wave, means for listening to said audio energy, a means for converting the remaining energy portion of said square wave into a series of standard pulses having a fixed amplitude and time duration with a repetition rate functional of the repetition rate of the incoming pulses, and a means for using said standard pulses to control the average flow of plate current through a vacuum tube.

5. In combination a means for detecting the presence of a remote pulse transmitter and measuring the frequency output thereof and a means for measuring the pulse repetition rate of said pulse transmitter, comprising, an antenna, a diode, means connecting the output of said antenna to the anode of said diode, a frequency calibrated means for causing maximum signal voltage having any particular frequency within a definite frequency range to occur across said diode, an amplifying means connected to the output of said diode and amplifying the rectified output of said diode, a means converting the output of said amplifying means into a square wave voltage, a means for using a portion of said square wave voltage to generate an audio note, a means for listening to said audio note, a means for using the remaining portion of said square wave voltage to generate a series of standard pulses having a fixed amplitude and time duration with a repetition rate functional of the repetition rate of said incoming signals from said pulse transmitter and a means for using said series of standard pulses for controlling the average current flow through a current responsive device.

6. In combination a means for detecting the presence of a remote pulse transmitter and measuring the frequency output thereof and a means for measuring the pulse repetition rate of said pulse transmitter, comprising, an antenna, a diode, means connecting the output of said antenna to the anode of said diode, a frequency calibrated means for causing maximum signal voltage having any particular frequency within a definite frequency range to occur across said diode, a cascaded amplifier section connected to the output of diode and amplifying the rectified output of said diode, a means converting the output of said amplifying means into a square wave voltage, a means for using a portion of said square wave voltage to generate an audio note, a means for listening to said audio note, a means for using the remaining portion of said square wave voltage to generate a standard series of pulses having a fixed amplitude and time duration with a repetition rate functional of the repetition rate of said incoming signals from said pulse transmitter and a means for using said series of standard pulses for controlling the average current flow through a current responsive device.

7. In combination a means for detecting the presence of a remote pulse transmitter and measuring the frequency output thereof and a means for measuring the pulse repetition rate of said pulse transmitter, comprising, an antenna, a diode, means connecting the output of said antenna to the anode of said diode, a variable inductance calibrated in either frequency or wave length connected in shunt with said diode and capable of tuning to anti-resonance the antenna reactance and diode stray capacities at any particular frequency within a definite frequency range for causing maximum signal voltage to occur across said diode, a cascaded amplifier section connected to the output of said diode and amplifying the rectified output of said diode, a means converting the output of said amplifying means into a square wave voltage, a means for using a portion of said square wave voltage to generate an audio note, a means for listening to said audio note, a means for using the remaining portion of said square wave voltage to generate a series of standard pulses having a fixed amplitude and time duration with a repetition rate functional of the repetition rate of said incoming signals from said pulse transmitter and a means for using said series of standard pulses for controlling the average current flow through a current responsive device.

8. In combination a means for detecting the presence of a remote pulse transmitter and measuring the frequency output thereof, and a means for measuring the pulse repetition rate of said pulse transmitter comprising, a means for receiving incoming pulse energy having any particular frequency within a definite frequency range, said receiving means being adjustable to any particular frequency within said frequency range, a means for indicating either in frequency or in wave length the particular setting of said receiving means, a means for converting said pulse energy into a series of square wave energy pulses having a fixed amplitude and a repetition rate functional of said incoming pulses, a means for converting said square wave energy pulses into a series of standard energy pulses having a fixed amplitude and time duration with a repetition rate functional of the repetition rate of the incoming pulses and a means for controlling the average current flow through a current responsive device with said standard energy pulses.

9. In combination, a means for detecting the presence of a remote pulse transmitter and measuring the frequency output and the pulse repetition rate thereof comprising, a means for receiving incoming pulse energy having any particular frequency within a definite frequency range, said receiving means being adjustable to any particular frequency within said frequency range, a means for indicating either in frequency or in wave length the particular setting of said receiving means, a means responsive to said pulse energy for generating a series of square wave energy pulses having a fixed amplitude and a repetition rate functional of the repetition rate from the incoming pulses, differentiating means responsive to said square wave energy pulses to produce trigger pulses, and means responsive to said trigger pulses to produce standard energy pulses having a fixed amplitude and time duration and a repetition rate functional of the repetition rate from the incoming pulses, and a means responsive to said standard pulses to control the average current flow through a current responsive device.

C. EDGAR KOONTZ.
IRVING H. PAGE.

REFERENCES CITED

The following references are of record in the file of this patent:

UNITED STATES PATENTS

| Number | Name | Date |
| --- | --- | --- |
| 2,061,734 | Kell | Nov. 24, 1936 |
| 2,218,642 | Hathaway | Oct. 22, 1940 |
| 2,228,367 | Sanders, Jr. | Jan. 14, 1941 |
| 2,266,401 | Reeves | Dec. 16, 1941 |
| 2,352,082 | De Rosa | June 20, 1944 |
| 2,358,028 | Peterson | Sept. 12, 1944 |
| 2,381,928 | Roberts | Aug. 14, 1945 |

OTHER REFERENCES

Review of Scientific Instruments, December 1936, page 454.